Sept. 13, 1955     M. KAPP     2,717,807
WHEEL ASSEMBLY UNIT FOR MINIATURE VEHICLES AND AIRPLANES
Filed Jan. 29, 1954
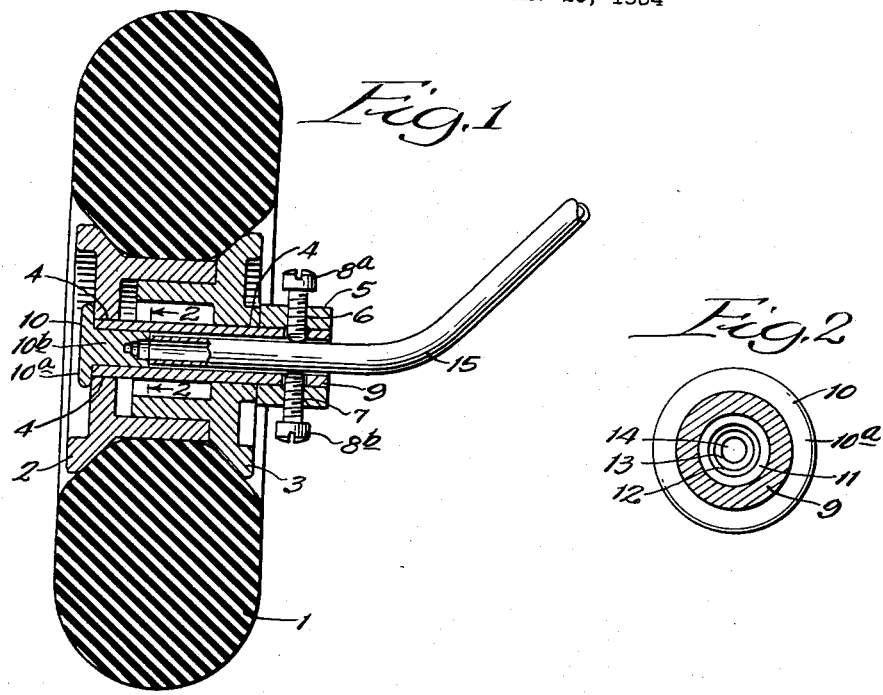
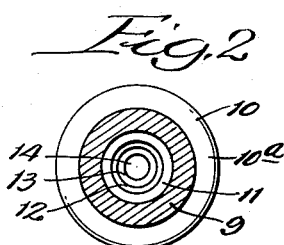
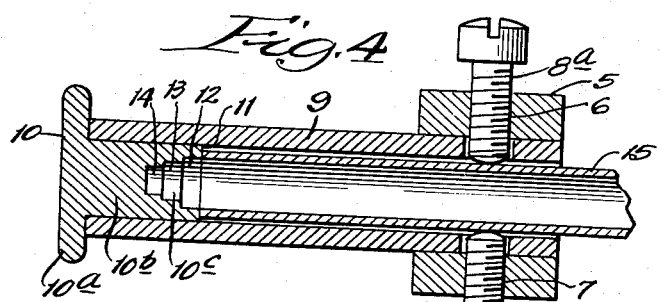
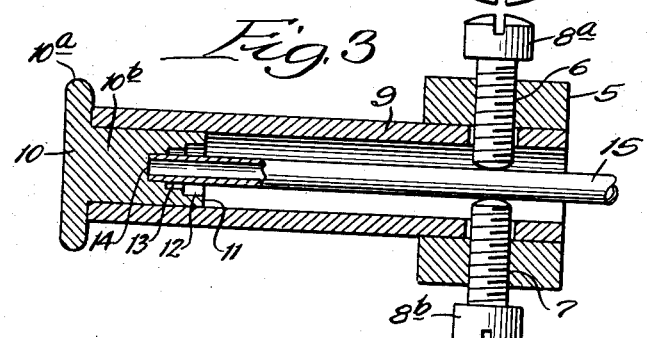
INVENTOR:
Morton Kapp,
BY
Owns, McDougall, Williams & Hersh,
ATTORNEYS.

United States Patent Office 2,717,807
Patented Sept. 13, 1955

2,717,807
WHEEL ASSEMBLY UNIT FOR MINIATURE VEHICLES AND AIRPLANES

Morton Kapp, Chicago, Ill.

Application January 29, 1954, Serial No. 407,007

4 Claims. (Cl. 301—1)

My invention relates to an improved wheel assembly unit for miniature and model vehicles and aircraft. The improvement resides in the construction of a wheel which permits the insertion and securing therein of axles and similar supports of varying diameters and dimensions.

I have devised this improvement in connection with model airplanes, but the novelty is applicable to other miniature vehicles and is particularly useful in children's toys.

In accordance with the present invention the wheel comprises two mating halves. When these two mating halves are joined (as by press fitting) a rim portion is formed. This rim portion can receive and hold the tire.

A hub for receiving and holding the axle is formed within the wheel. Into this hub is inserted a sleeve bushing.

To provide for reception and retention of axles of varying diameters, there is provided a spindle. This spindle is comprised of a face plate, which acts as a hub cap, and a pin portion. There is a cavity within the pin portion, opening at the end opposite the face plate. This cavity within the pin portion presents, at its inner end, an annular abutment which functions as the bottom face of a socket for seating the tip of an axle.

The spindle is inserted into the outer end of the hub and can be secured there, as by a press fit or other means. The spindle itself can either be manufactured and sold separately or be permanently mounted in the wheel assembly.

The walls of the pin portion of the spindle is of varying thicknesses at its projecting end, and presents a series of coaxial socket portions. Each such socket position is defined by a cylindrical wall, and the socket portions more remote from the projecting end of the pin portion are defined by cylinders of smaller radii. As the axle is inserted into the hub and enters into the spindle, the axle will pass through those socket portions of greater diameter than the axle itself. The axle will be intercepted and become engaged by the socket of appropriate diameter as it passes further into the narrowing cavity.

The effect of this invention is to permit the same wheel spindle, and hub tube to be used in connection with axles of varying diameters. If the axle is of a large diameter, it will abut the end of the pin portion of the axle jacket, and lie in the socket defined by the hub tube and the annular end of the pin portion. If the axle is smaller, it will become engaged at one of the sockets anterior to the opening of the cavity formed in the pin portion of the spindle.

An axle, having been inserted into the hub and seated in the spindle, may then be secured in place by means of set screws or other like securing devices situated in a collar mounted on the inner side of the wheel in contact with the hub. The collar may be formed with radial screw-threaded apertures suitably positioned to accomplish the holding function.

Heretofore, in miniature vehicles, model airplanes, toys and the like, the axle has been inserted into the hub and extended completely therethrough, to project slightly from the outer side thereof. It has then been secured in place by means of a hub cap or other means attached to this outer projection.

The hub has been of uniform diameter throughout. The result has been that axles of only one size could fit properly therein. Axles of diameters less than that of the inside of the hub has permitted a "play." This play has resulted in an undesirable and unstable "wobble."

Previous attempts to remedy this wobble have been unsatisfactory. These attempts have included notching the axle and engaging in the notch a retainer clip or ring extending into the hub. These efforts have proved unsatisfactory because they weaken the axle itself, and considerable experimentation is required to make the notch in the axle coincide with the retainer within the hub.

Such efforts have been especially unsatisfactory because model airplanes and miniature vehicles are frequently designed for assembling by children, who have neither the patience nor the mechanical aptitude to make the required adjustments.

It is therefore the general object of the present invention to provide an improved wheel assembly unit with means for engaging miniature and model vehicle axles and airplane landing gear characterized by ease and economy of manufacture and by more facile construction and adjustment. The improvement permits a single wheel to be utilized on axles and landing gears of various diameters and dimensions.

The novel features which are believed to be characteristic of my invention are set forth with particularity in the appended claims. My invention itself, together with further objects and advantages thereof, will best be understood by reference to the following description taken in conjunction with the accompanying drawings, in which:

Figure 1 is a cross-sectional view of a complete wheel assembly constructed in accordance with the principle of the invention;

Fig. 2 is a view in elevation of the spindle as viewed from the open end of its pin portion;

Fig. 3 is a cross-sectional view of the spindle as it appears when the axle is seated in the socket of smallest diameter; and Fig. 4 is a similar cross-sectional view of the spindle, with an axle seated in the socket of largest diameter.

Referring now to the drawings, a tire 1 is fitted upon the wheel assembly which is itself formed by the mating halves 2 and 3. The wheel defines a hub 4 into which an axle may be received.

Extending from the inner face of the hub 4 is a collar 5. This collar 5 is pierced by one or more radial holes 6, 7, which may be threaded for the insertion of screws 8a, 8b or other securing devices. The hub 4 is fitted with a sleeve bushing 9 secured in rotatable relationship to the mating halves 2 and 3 of wheel assembly.

A spindle 10 is inserted into the outer end of the hub 4, with the face portion 10a of the axle jacket forming the hub cap portion of the wheel assembly. The pin portion 10b of the axle jacket 10 extends inwardly into the hub.

As particularly shown in Fig. 2, the cavity 10c within the pin portion 10 is stepped to provide an inner wall of varying diameters. Starting with the outer rim 11 of the stepped cavity 10c, the cavity 10c first diminishes in diameter at zone 12. The cavity 10c narrows further at the next zone 13. After a plurality of such zones the stepped cavity 10c terminates at the bottom wall 14. Each of a plurality of zones 12, 13 and the wall 14 of the cavity form sockets into which the axle may fit. The face 11 or outer rim 11 of the cavity 10c forms, in conjunction with the respective zones 12, 13, and the bottom wall of the cavity 14, a coaxial series of sockets of varying diameters.

Fig. 3 is the spindle 10, seating an axle 15 at the bottom wall 14 of the cavity 10c. The axle 15 in Fig. 3 is of the smallest diameter which the spindle 10 can accommodate. The axle 15 has passed through the sockets of wider diameter 11, 12, 13, and come to rest at the bottom wall 14 of the cavity 10c.

In Fig. 4 the spindle 10 seats an axle 15 of wider diameter at the outer rim 11 of the cavity 10c, which forms one of the coaxial series of sockets 11, 12, 13, 14.

From these drawings it is apparent that as an axle 15 is inserted first into the hub 4 and proceeds into the axle jacket 10, the axle 15 will be seated at the outer rim 11, or at one of the several sockets 12, 13 formed by the respective zones of varying diameters, or by the bottom wall 14 of the cavity 10c. If the axle 15 is of comparatively wide diameter, it will be intercepted at the outer rim 11. If the axle is of lesser diameter it will be intercepted at the first narrowed zone of the cavity 10c, or at the second narrowed zone 13, or at the bottom wall 14 of the cavity 10c.

After the axle 15 has been inserted into the hub 4 and intercepted at the appropriate socket 11, 12, 13, 14 of the spindle 10, the axle 15 can be secured in place by means of set screws 8a, 8b or other like securing devices inserted into the radial holes 6, 7 which are situated in the collar 5.

The chief utility of this invention is that the same wheel embodying the spindle as herein described can be used on miniature vehicles or model airplanes having axles and landing gear of varying diameters.

While I have shown and described a specific embodiment of my invention, it will of course be understood that I do not wish to be limited thereto and that by the appended claims I intend to cover all modifications and alternative constructions falling within the true spirit and scope of the claims.

What I claim as new and desire to secure by Letters Patent of the United States is:

1. A spindle for miniature and model vehicles and airplane wheels adapted to be axially positioned in a wheel to seat therein a cooperating axle, said spindle comprising a face portion and a pin portion mounted on the said face portion and extending axially therefrom, said pin portion defining a plurality of coaxial sockets within its inner end.

2. In a wheel for miniature and model vehicles and airplanes having a rim formed by two mating halves and defining a hub in which a sleeve bushing has been mounted, the provision of axle centering means comprising a face portion engageable by the outer face of the wheel hub and extending axially by means of its pin portion into the hub, said pin portion defining within its inner end a cavity formed by a plurality of coaxial sockets.

3. In a wheel for miniature and model vehicles and airplanes having a rim formed by two mating halves and defining a hub portion, the provision of axle centering means comprising a face portion engageable by the outer face of the wheel hub and a pin portion and extending axially in said hub, said pin portion defining within, a cavity formed by a plurality of coaxial sockets.

4. In combination with a wheel hub for miniature and model vehicles and airplanes, a spindle comprising a face portion engaged upon the outer end of the hub and mounted thereon, a pin portion extending axially into the hub, said pin portion containing a cavity open at its inner end with the inner wall of the cavity defined by a plurality of coaxial sockets.

References Cited in the file of this patent

FOREIGN PATENTS 924,034     France  ---------------  Mar. 3, 1947